United States Patent [19]

Palkert et al.

[11] Patent Number: 4,905,257
[45] Date of Patent: Feb. 27, 1990

[54] MANCHESTER DECODER USING GATED DELAY LINE OSCILLATOR

[75] Inventors: Thomas G. Palkert, St. Paul; John A. Kolling, Eagan, both of Minn.

[73] Assignee: Unisys Corporation, Blue Bell, Pa.

[21] Appl. No.: 238,383

[22] Filed: Aug. 31, 1988

[51] Int. Cl.⁴ .................. H04B 14/02; H04L 27/22
[52] U.S. Cl. ............................ 375/87; 341/70
[58] Field of Search ............... 341/70, 71; 360/42, 360/43; 331/173; 375/55, 87, 110; 329/104, 105

[56] References Cited
U.S. PATENT DOCUMENTS

| | | | |
|---|---|---|---|
| 3,491,349 | 1/1970 | Sevilla et al. | 360/42 |
| 4,185,273 | 1/1980 | Gowan | 341/70 |
| 4,344,041 | 8/1982 | Maine | 375/87 |
| 4,542,420 | 9/1985 | Kozlik et al. | 360/42 |

Primary Examiner—Benedict V. Safourek
Attorney, Agent, or Firm—Albert B. Cooper; Glenn W. Bowen; Robert S. Bramson

[57] ABSTRACT

Manchester level coded data is converted to NRZ by two gated delay line oscillators responsive to differential Manchester signals for providing a single gated pulse in response to consecutive data cells conveying the same data and for providing two pulses in response to a data change. A decoder circuit responds to the two pulse condition by toggling a data flip-flop that provides the NRZ data. The flip-flop also controls gates responsive to the two oscillators for selecting between the two oscillator signals to provide the NRZ clock. When the system bus ceases data transmission, three or more oscillator pulses are generated, the detection of which is utilized to preset the data flip-flop.

8 Claims, 3 Drawing Sheets

MANCHESTER DECODER USING GATED DELAY LINE OSCILLATOR

BACKGROUND OF THE INVENTION

1. Field of the Invention

The invention relates to digital communication particularly with respect to decoding Manchester coded data.

2. Description of the Prior Art

Manchester coding is a popular data format for digital baseband communication. Manchester coding utilizes phase shift keying (PSK) to encode both clock and data into a single serial pulse stream. In the Manchester level or biphase level format (BPL), a transition occurs at the center of every data cell, the polarities thereof designating the binary data. This format utilizes a phase shift for each transistion between binary states. In such systems, a traditional format such as NRZ (non-return to zero) is encoded into Manchester, the Manchester code transmitted and the recovered Manchester code decoded back into NRZ. It is desirable in such systems, to incorporate the encoding and decoding circuitry into fully integrated circuits such as inexpensive digital gate array implementations. In traditional megahertz systems, encoders and decoders are known that operate at megahertz rates that are compatible with digital gate array implementation. Such conventional decoding techniques involve asynchronously sampling the Manchester code with a sampling clock running at a high multiple of the data rate. Traditionally, sampling may be effected at twelve times the data rate.

Another conventional decoding approach utilizes analog phase locked loop (PLL) circuitry. Phase locked loops tend to be complex and incompatible with digital standard cell or gate array implementation. Additionally, when utilizing PLL technology, a preamble or "leader" bits must precede a Manchester coded data transmission in order to phase lock the loop to the incoming data stream. In high frequency communication channels, especially linear buses, the preamble bits add significantly to the overhead costs of the channel, reducing the maximum possible data throughput.

With the advent of fiber optic communication channels, it has become possible to transmit information at extremely high data rates such as in the gigahertz range. The conventional digital decoding techniques, such as asynchronous sampling, fail to operate at these frequencies. For example, a fiber optic channel with a 1 gigahertz data rate, may require a 12 gigahertz sampling clock which is beyond the capabilities of available circuitry. Thus, in such high frequency applications, the phase locked loop is the only technology available for use as the decoding circuitry with the attendant disadvantages discussed above such as incompatibility with the fully integrated inexpensive digital gate array technology and the requirement of a preamble that undesirably loads the data bus.

SUMMARY OF THE INVENTION

The above-described disadvantages of the prior art are overcome by utilizing oscillator means enabled and disabled by the Manchester coded data and means for counting the number of oscillator cycles to determine when a phase change has occurred in the data. A flip-flop is toggled when a phase change occurs. The output of the flip-flop provides the decoded NRZ data corresponding to the input Manchester data. Preferably, the oscillator means includes a delay line oscillator gate on and off by the Manchester waveform. The delay line is tuned so that the oscillator executes a predetermined number of cycles during the Manchester pulses that occur in the absence of a phase change. In the absence of a phase change, a a leading edge of a Manchester pulse gates the oscillator on and the pulse trailing edge gates the oscillator off. When a phase change occurs, a wider Manchester pulse results, gating through more oscillator cycles than the predetermined number of cycles.

DESCRIPTION OF THE PREFERRED EMBODIMENT

Figure 1A:
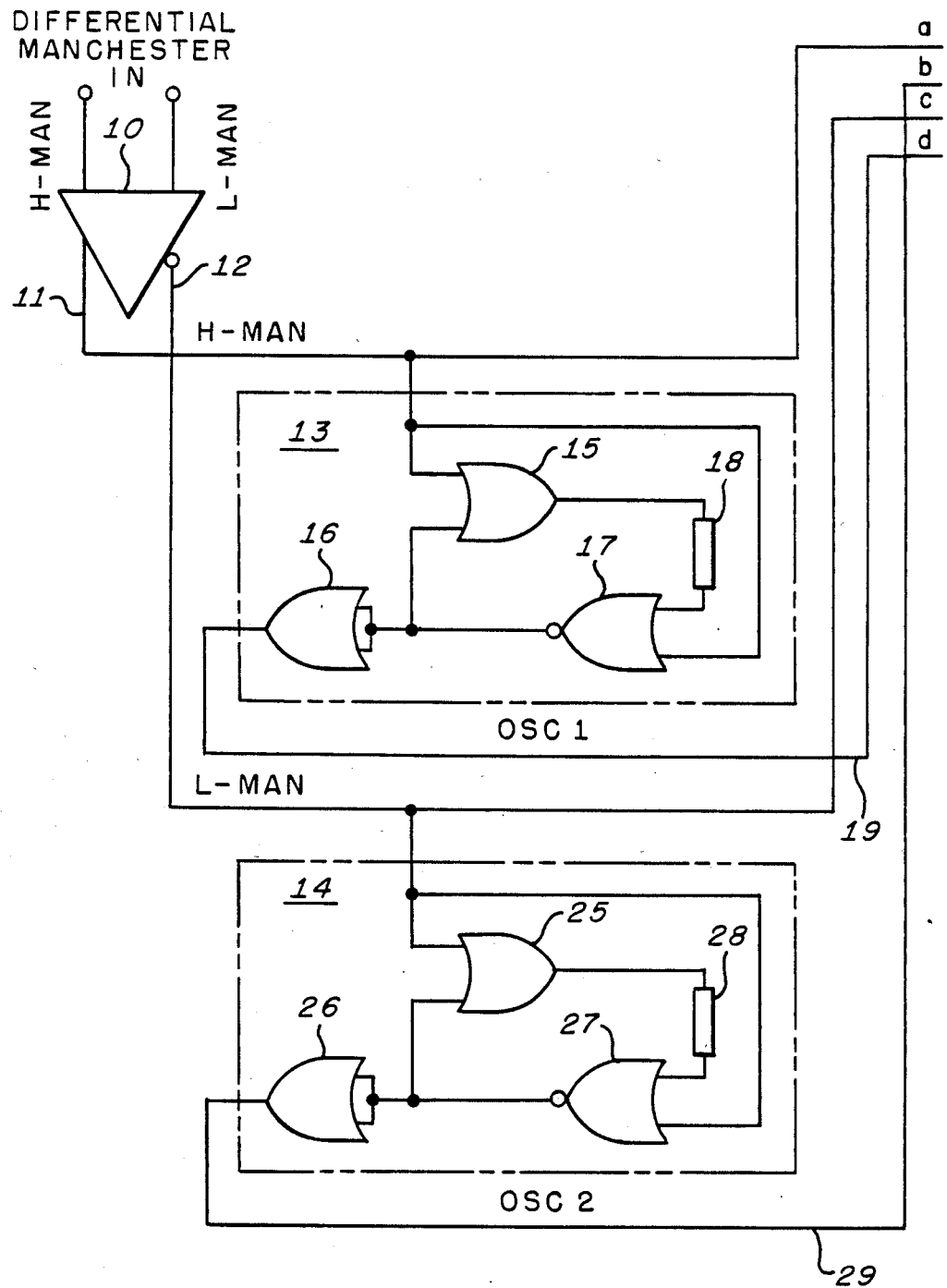
FIGS. 1a and 1b are schematic block diagrams of the Manchester decoder implemented in accordance with the present invention.
Figure 1B:
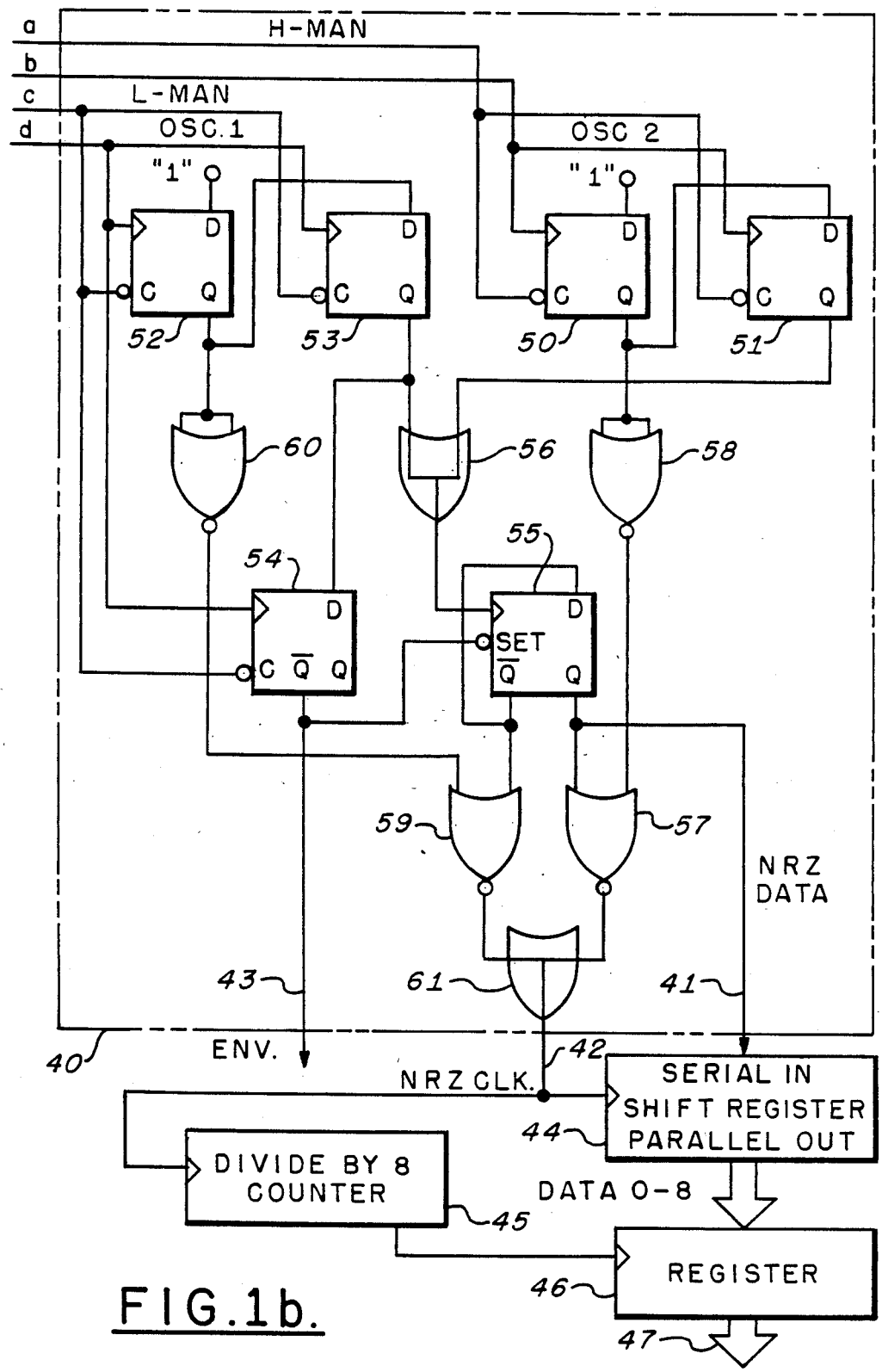
Figure 2:
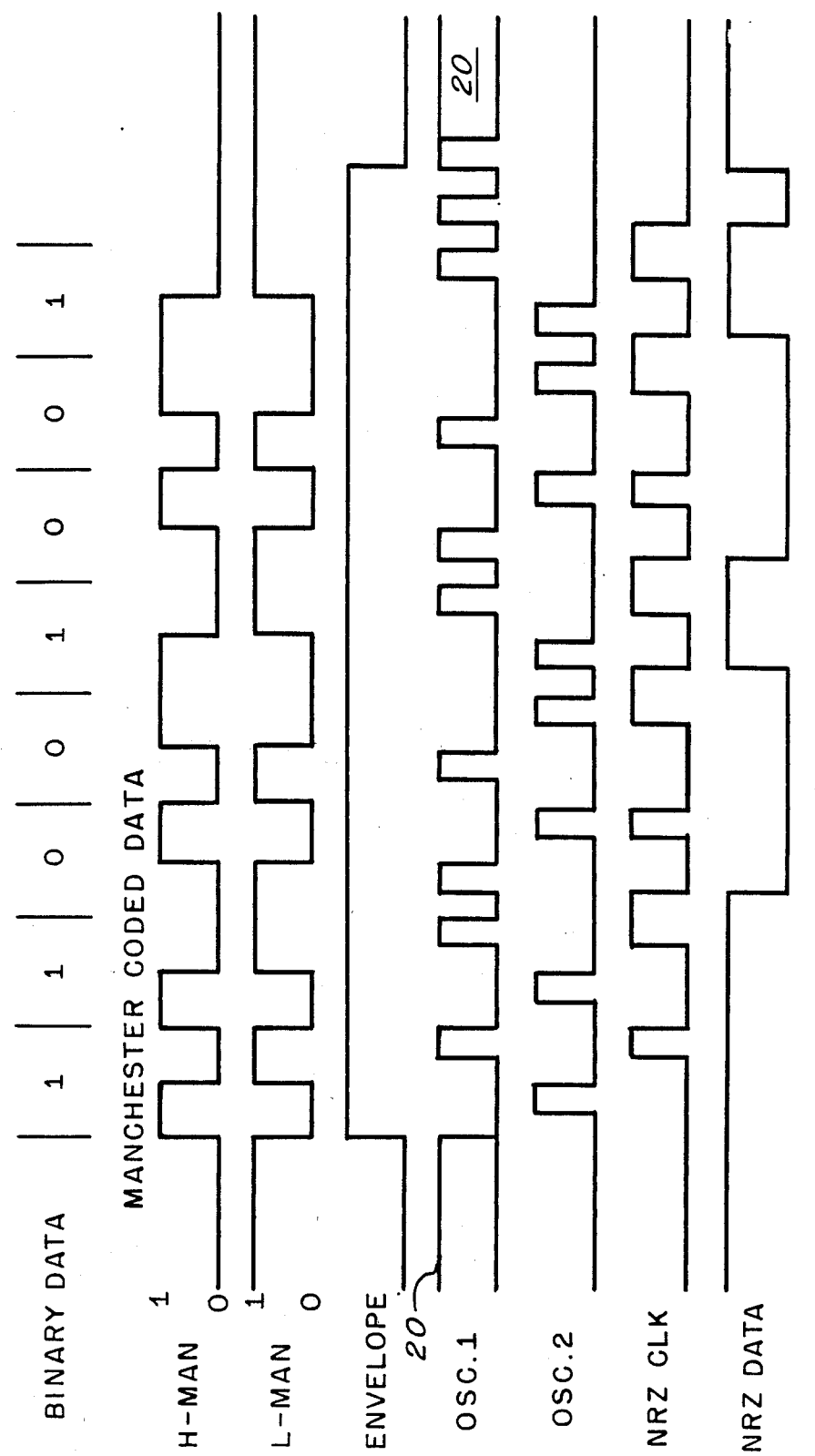
FIG. 2 is a diagram illustrating waveforms useful in explaining the operation of the apparatus of FIGS. 1a and 1b.

The decoder of FIG. 1 is designed to convert high frequency Manchester coded data into NRZ format. The decoder of FIG. 1 is particularly designed for use in a high speed fiber optic communication channel. Preferably, gallium arsenide components are utilized in the areas of critical high frequency switching because of the high data rates being decoded. In the embodiment described herein, Manchester level coding is utilized wherein a binary ONE is transmitted as a negative-going transition in the center of the data cell and a binary ZERO is transmitted as a positive-going transition in the center of the data cell. Typical Manchester coded data is illustrated in FIG. 2 as the H-Man and L-Man waveforms. The fiber optic system, in which the decoder of the present invention is utilized, is an asynchronous system in which no light is transmitted along the fiber between messages. It is appreciated, therefore, that H-Man is transmitted on the fiber in which the first message event is a rising edge resulting from transmission of light. The first data bit is conveyed by a discontinuance of light resulting in a falling edge. It is therefore appreciated that by convention all messages must begin with binary ONE. The fiber optic communication line is coupled to the decoder of FIG. 1 by a fiber optic receiver (not shown) that provides the differential Manchester signals H-Man and L-Man as illustrated in FIG. 2.

The differential Manchester signals are applied to the decoder of FIG. 1 through a differential buffer driver 10 that provides the H-Man signal on a line 11 and the L-Man signal on a line 12. Thus, between transmission of messages, H-Man is low and L-Man is high. When the bus goes high at the beginning of a message, H-Man goes high and L-Man goes low.

The H-Man signal on the line 11 and the L-Man signal on the line 12 are applied as inputs to identical gated delay line oscillators 13 and 14, respectively. The oscillator 13 is comprised of two input OR gates 15 and 16 and a two input NOR gate 17. The H-Man signal on the line 11 is applied as one input to the OR gate 15 and the NOR gate 17. The connection between the H-Man input to the OR gate 15 and the H-Man input to the NOR gate 17 should be designed as short as possible and preferably the path lengths from the H-Man input to the oscillator 13 to the inputs of the OR gate 15 and the NOR gate 17 should be identical with respect to each other so that H-Man is applied to the gates 15 and 17 without phase delay therebetween.

The output of the OR gate 15 is coupled to an input of the NOR gate 17 via a delay line 18. The output from the NOR gate 17 is applied as an input to the OR gate 15 to close the feedback loop of the oscillator 13. The path from the output of the NOR gate 17 to the input of the OR gate 15, similar to the H-Man inputs to the gates 15 and 17, should be as short as possible so that the delay line 18 is the controlling factor in the operation of the oscillator 13. The output of the NOR gate 17 is applied to a line 19 via the OR gate 16. The output of the oscillator 13 on the line 19 is denoted as the OSC 1 signal. The OR gate 16 functions as a buffer between the oscillator 13 and the decoder circuitry to be described.

The oscillator 13 utilizes the delay line 18 to form a ring oscillator with a frequency determined by the length of the delay line. The delay line 18, which in the described embodiment is a length of transmission line, is trimmed so that the total loop delay including the propagation delays of the gates 15 and 17 is equal to one-half of the minimum pulse width of the Manchester coded data. When the H-Man signal on the line 11 is high, the oscillator 13 is disabled. When the H-Man signal goes low, the oscillator 13 is enabled to oscillate at its tuned frequency. Thus, the gated delay line oscillator 13 generates clock pulses that are phase locked to the incoming Manchester coded data stream. The gating by the Manchester data of the oscillator 13 results in a phase lock condition of the oscillator with the edges of the Manchester coded data. The decoding method utilizing the oscillator 13 exhibits zero lock-in-time, minimal power dissipation and minimal delay line circuitry. In order to maximize the allowable pulse width distortion and jitter of the incoming Manchester pulses, the delay line oscillator 13 is gated at the input by the gate 15 and at the output by the gate 17. This permits the delay line 18 to be accurately tuned to recover the Manchester data and convert the data to NRZ.

The oscillator 13 is tuned to have a natural frequency of twice the Manchester data rate. When the bus is low between messages, the oscillator 13 is enable and generates a train of clock pulses as indicated at 20 in FIG. 2. Upon receipt of the first rising edge of H-Man, the oscillator 13 is disabled. Since the first bit is a ONE, the falling edge in the center of the data cell enables the oscillator 13 which provides an OSC 1 pulse on the line 19 one-half a Manchester pulse later. This pulse is terminated by the next rising edge of H-Man. When the data is a sequence of binary ONES, the oscillator 13 is rephase locked by each of the H-Man falling edges. When the data changes from ONE to ZERO, a wider Manchester pulse occurs gating through two successive OSC 1 pulses for reasons to be described.

In a manner identical to that described with respect to the oscillator 13, the oscillator 14 is comprised of OR gates 25 and 26, a NOR gate 27 and a delay line 28. The output of the oscillator 14 is provided on a line 29 and is denoted as OSC 2.

The oscillator 14 functions in a manner identical to that described above with respect to the oscillator 13 except that the oscillator 14 is coupled to receive the L-Man signal on the line 12. The oscillator 14 therefore is gated on by the falling edges of the L-Man signal and gated off by the rising edges thereof. Since L-Man and H-Man are 180° out-of-phase with respect to each other, the oscillator 14 is in effect triggered by the rising edges of H-Man and disabled by the falling edges thereof. The oscillator 14 therefore provides resynchronized phase locked pulses in response to successive binary ZEREOS and two successive pulses at the oscillator natural frequency in response to a binary ZERO to a binary ONE phase shift in the data. It is appreciated therefore, and is illustrated in FIG. 2, that the oscillator 13 (OSC 1) generates clock edges that are synchronous with the negative pulses of the incoming Manchester coded data (H-Man) and the oscillator 14 (OSC 2) generates clock edges that are synchronous with the positive pulses of the incoming Manchester coded data. The oscillators 13 and 14 are tuned so that one gated clock pulse is produced for each Manchester pulse absent a phase shift caused by a data change. When a data change occurs, two gated clock pulses are produced. The oscillators 13 and 14 therefore phase lock on each Manchester leading edge to generate the corresponding clock pulse and are cut off by the trailing edges of the Manchester waveform. OSC 1 and OSC 2 pulses are illustrated in FIG. 2 for an exemplary data stream.

Each of the oscillators 13 and 14 may also be implemented by two input NOR gates. The delay line would be coupled between a first input and the output of the first NOR gate which would receive H-Man or L-Man at the second input thereof. The two inputs of the second NOR gate would be connected together and coupled to the output of the first NOR gate. The second NOR gate would function as a buffer and inverted to provide the OSC 1 or OSC 2 signal. The oscillator input gating would be performed by the first NOR gate and the output gating would effectively be achieved by the clear inputs to flip-flops in the decoder circuitry, to be described, to which the OSC 1 and OSC 2 signals are applied as clock inputs. This alternative gated oscillator design may be faster than that illustrated in FIG. 1 since the propagation delay through one gate is eliminated.

With continued reference to FIGS. 1 and 2, the H-Man signal on the line 11, the L-Man signal on the line 12, the OSC 1 signal on the line 19 and the OSC 2 signal on the line 29 are applied to a decoder circuit 40 for converting the Manchester data to NRZ data. The decoder circuit 40 provides the NRZ data on a line 41 and the NRZ clock on a line 42. The decoder circuit 40 also provides an envelope signal on a line 43 that goes high upon receipt of the first Manchester leading edge and goes low when the bus goes dark after termination of a message. The serial NRZ data on the line 41 is clocked into a serial-to-parallel register 44 by the NRZ clock on the line 42. The NRZ clock is divided by eight in a counter 45 and the divided NRZ clock signal is applied to a buffer holding register 46 as the clock input thereof. Thus the parallel NRZ data from the register 44 is loaded into the holding register 46 on 8-bit boundaries. The buffer register 46 applies the 8-bit bytes stored therein to the system via a bus 47. The decoder circuit 40 provides the serial NRZ data on the line 41 at the speed of the incoming serial Manchester data. Thus, it is appreciated that the components 44–46 permit the decoder circuit 40 to interface to logic operating at ⅛th the speed of the incoming serial data. The envelope signal on the line 43 advises the system to which the NRZ data is transmitted that a data message is being received.

The H-Man signal is applied as the clear input to D-type flip-flops 50 and 51 which are clocked by the OSC 2 signal. The Q output of the flip-flop 50 is applied to the D input of the flip-flop 51 and the D input of the flip-flop 50 is connected to a source of logic ONE.

The L-Man signal is applied to the clear inputs of D-type flip-flops 52 and 53 which are clocked by the OSC 1 signal. In a manner similar to that described with respect to the flip-flops 50 and 51, the Q output of the flip-flop 52 is connected to the D input of the flip-flop 53 and the D input of the flip-flop 52 is connected to logic ONE. The L-Man signal is also applied to the clear input of a D-type flip-flop 54 which is also clocked by the OSC 1 signal. The Q' output of the flip-flop 54 provides the envelope signal on the line 43 in a manner to be described.

The Q outputs of the flip-flops 51 and 53 are utilized to clock a D-type flip-flop 55 via a wired-or connection 56. The Q' output of the flip-flop 55 is connected to the D input thereof to provide a toggle flip-flop configuration. The envelope signal on the line 43 is applied to the set input of the flip-flop 55 to set the flip-flop 55 to the Q state in response to falling edges of the envelope signal. When the envelope signal on the line 43 is high, the flip-flop 55 toggles in response to rising clock edges from the wired-OR gate 56. The Q output of the flip-flop 55 provides the serial NRZ data on the line 41. The flip-flops 50-54 are cleared on falling edges applied to the clear inputs thereof and are clocked on rising edges applied to the clock inputs thereof.

The Q output of the flip-flop 50 is applied to a NOR gate 57 through an inverting NOR gate 58. In a similar manner, the Q output of the flip-flop 52 is applied to a NOR gate 59 through an inverting NOR gate 60. The outputs of the NOR gates 57 and 59 are combined in a wired-or connection 61 to provide the NRZ clock on the line 42. Second inputs to the NOR gates 57 and 59 are connected, respectively, to the Q and Q' outputs of the flip-flop 55 to select OSC 1 or OSC 2 to generate the NRZ clock pulses.

As discussed above, the oscillator 13 is enabled by falling edges of H-Man and disabled by rising edges thereof. The oscillator 14 is enabled by falling edges of L-Man and disabled by rising edges thereof. Thus, for a binary ZERO Manchester cycle, an OSC 1 pulse is generated followed by an OSC 2 pulse. If the next successive bit is a ZERO, the oscillator 14 is disabled by the next rising edge of L-Man after the one OSC 2 pulse is generated. If, however, the next successive bit is a binary ONE, the rising edge of L-Man on the bit cell boundary does not occur and oscillator 14 remains enabled and generates a second OSC 2 pulse. In a similar manner, a binary ONE Manchester cycle results in an OSC 2 pulse followed by an OSC 1 pulse. When the next successive bit is also binary ONE, oscillator 13 is disabled by the rising edge of H-Man on the bit cell boundary permitting only one OSC 1 pulse to be gated through. When, however, the next succeeding bit is binary ZERO, two successive OSC 1 pulses result.

For successive binary ONES, the flip-flop 52 and NOR gate 60 generate the NRZ clock pulses which are gated through the enabled NOR gate 59 to the line 42. For binary ONES, the data flip-flop 55 is in the Q state thereby providing the appropriate NRZ data on the line 41 while enabling the NOR gate 59 to select the OSC 1 pulses for the generation of the NRZ clock. In a similar manner for successive binary ZEREOS, the flip-flop 50 and the NOR gate 58 generates the NRZ clock pulses which are transmitted through the NOR gate 57 to the line 42. For binary ZERO, the data flip-flop 55 is in the Q' state providing the appropriate NRZ data on the line 41 and enabling the NOR gate 57 to select the OSC 2 pulses for generating the NRZ clock. When the binary data changes from ONE to ZERO, a phase change occurs in the Manchester coded data so as to permit the second OSC 1 pulse to set the flip-flop 53 thereby toggling the data flip-flop 55. For a binary ZERO to a binary ONE transition, the second OSC 2 pulse sets the flip-flop 51 which in turn toggles the data flip-flop 55. It is therefore appreciated that the flip-flops 50 and 52 eliminate the multiple clock pulses during the phase change which occurs when the data content of the Manchester coding changes state. The NRZ data is generated by the flip-flop 55 and the NRZ data output thereof toggles when the phase change is detected in the incoming Manchester coded data as indicated by the two consecutive cycles of the delay line oscillators.

As previously described, a requirement imposed by the decoder of the present invention on the incoming Manchester coded data is an a-priori knowledge of the state of the first bit. The decoder assumes a first bit value of binary ONE. This is required by the system because of the interface to fiber optic components that do not generate true bipolar Manchester. With unipolar Manchester, the proper phase selection cannot be effected without knowing the data content of the first bit. The assumed first bit value of ONE is effected by presetting the flip-flop 55 to the Q state prior to the receipt of a message.

In operation, with continued reference to FIGS. 1 and 2, prior to receipt of a message, the flip-flops 50 and 51 are cleared, the flip-flop 55 is set to the Q state and the flip-flop 54 is set to the Q state. Thus, prior to the message, the data flip-flop 55 is set to NRZ binary ONE and the envelope signal on the line 43 is low maintaining the set on the flip-flop 55. The flip-flops 50 and 51 are cleared by the last falling edge of the H-Man message when the bus goes to its quiescent logic ZERO state. Upon receipt of the first rising edge of a message, L-Man provides a falling edge which clears the flip-flops 52, 53 and 54. Clearing the flip-flop 54 drives the envelope signal 43 high which removes the set from the flip-flop 55. This first rising edge of H-Man also disables the free running oscillator 13 which cuts off the OSC 1 pulses. As previously described, in response to the first Manchester cycle, an OSC 1 and an OSC 2 pulse are generated. Since the NOR gate 59 is enabled, the OSC 1 pulse becomes the NRZ clock signal on the line 42 which clocks the binary ONE state of the NRZ data on the line 41 into the shift register 44. It is appreciated that the OSC 2 pulse generated by the oscillator 14 is blocked by the disabled NOR gate 57.

As previously described, the first falling edge of L-Man clears the flip-flops 52-54. The OSC 1 pulse occurring in the first data cell clocks the permanently connected logic ONE into the flip-flop 52 setting it to the Q state creating the leading edge of the first NRZ clock pulse. The second falling edge of the L-Man signal again clears the flip-flops 52-54 creating the trailing edge of the first NRZ clock pulse. Since the next digit of the exemplary message of FIG. 2 is also binary ONE, the same cycle is repeated except that since the next following digit is binary ZERO, a phase change occurs and two consecutive OSC 1 pulses are generated. The first OSC 1 pulse sets the flip-flop 52 and the second OSC 1 pulse sets the flip-flop 53. The rising edge of the Q output of the flip-flop 53 toggles the data flip-flop 55 to the Q' state thereby enabling the NOR gate 57, disabling the NOR gate 59 and setting the NRZ data line 41 to binary ZERO. The binary ZERO digits are processed by the flip-flops 50 and 51 and the NOR gate 58 in the manner described with respect to the processing of the binary ONE digits by the flip-flops 52 and 53 and the NOR gate 60.

At the termination of the message, H-Man goes low, clearing the flip-flops 50 and 51 and permitting the oscillator 13 to free run thereby generating consecutive OSC 1 pulses. Since L-Man is high, the clear is removed from the flip-flops 52-54 and the first of the terminating OSC 1 pulses sets the flip-flop 52 to the Q state. The second OSC 1 pulse sets the flip-flop 53 to the Q state and the third such pulse sets the flip-flop 54 to the Q state. On the rising edge of the third consecutive OSC 1 pulse, the flip-flop 54 is set thereby driving the envelope signal on the line 43 low. This action places a set on the flip-flop 55 preparing the data flip-flop 55 for the next message.

It is appreciated from the foregoing that the decoding technique of the present invention does not require a data preamble or lock-in time as does the phase lock loop technology of the prior art. The present invention utilizes a delay line oscillators which are phase locked to the incoming Manchester signal, permitting decoding of the Manchester coded data without requiring the use of analog phase locked loop decoding circuitry. Since the present invention eliminates requirements for analog decoder circuits, cost effective digital gate array technology may be utilized to implement the present invention providing a significantly high level of decoder circuit integration. Since the present invention does not require a preamble on the Manchester coded serial data stream, overhead time on the data bus is saved permitting higher data throughputs. Since delay line oscillators inherently are not precise, the pre and post delay line gating permit precise mid bit clocking of the Manchester coded data. Although the present invention was described in terms of Manchester Level coding, it is appreciated that the precepts of the invention are also applicable to Manchester Mark and Manchester Space coding or any other coding with similar characteristics.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Apparatus for converting Manchester coded data signals into non-return to zero data signals, said Manchester coded data signals having first and second components that are the inverse of each other, said Manchester coded data signals being formatted in consecutive data cells, comprising
   a first gated oscillator enabled and disabled by first and second states, respectively, of said first component for generating a single pulse between enablement and disablement in response to consecutive data cells conveying the same binary data and for generating two pulses between enablement and disablement in response to consecutive data cells conveying a change in binary data,
   a second gated oscillator enabled and disabled by first and second states, respectively, of said second component for generating a single pulse between enablement and disablement in response to consecutive data cells conveying the same binary data and for generating two pulses between enablement and disablement in response to consecutive data cells conveying a change in binary data,
   first logic means responsive to said Manchester coded data signals and coupled to said first gated oscillator for providing a first toggling signal in response to the occurrence of said two pulses from said first gated oscillator, said first logic means being reset by said Manchester coded data signals,
   second logic means responsive to said Manchester coded data signals and coupled to said second gated oscillator for providing a second toggling signal in response to the occurrence of said two pulses from said second gated oscillator, said second logic means being reset by said Manchester coded data signals, and
   bistable means responsive to said first and second toggling signals for toggling in response to the occurence of either said first or second toggling signal,
   said bistable means providing said non-return to zero data signals.

2. The apparatus of claim 1 wherein
   said first logic means comprises means responsive to said second component and coupled to said first gated oscillator for providing said first toggling signal in response to the occurrence of said two pulses from said first gated oscillator, said first logic means being reset by said second component, and
   said second logic means comprises means responsive to said first component and coupled to said second gated oscillator for providing said second toggling signal in response to the occurrence of said two pulses from said second gated oscillator, said second logic means being reset by said first component.

3. The apparatus of claim 1 wherein said Manchester coded data signals comprise differential Manchester level coded data signals.

4. The apparatus of claim 3 further comprising clock generating logic responsive to said single pulses from said first and second gated oscillators and coupled to said bistable means for selecting between said single pulse from said first gated oscillator and said single pulse from said second gates oscillator in accordance with the state of said bistable means, thereby generating an output clock signal for clocking said non-return to zero data signals.

5. The apparatus of claim 3 wherein one of said gated oscillators comprises means for generating more than two pulses between enablement and disablement in response to no data being conveyed.

6. The apparatus of claim 5 further including envelope signal generating means responsive to said Manchester coded data signals and said more than two pulses for setting said bistable means to a predetermined state in response to said more than two pulses.

7. The apparatus of claim 3 wherein said first and second gated oscillators comprise first and second gated delay line oscillators, respectively.

8. The apparatus of claim 7 wherein each said first and second gated delay line oscillators comprises
   a delay line, and
   gating means prior to and following said delay line responsive to said first and second states of said Manchester coded data signals for enabling and disabling said gated delay line oscillator,
   said delay line being tuned so that the total propagation delay of said delay line and said gating means comprises approximately one-half of the narrowest pulse width of the pulses comprising said Manchester coded data signals.

* * * * *

UNITED STATES PATENT AND TRADEMARK OFFICE
CERTIFICATE OF CORRECTION

PATENT NO. : 4,905,257

DATED : February 27, 1990

INVENTOR(S) : Thomas G. Palkert, John A. Kolling, Terry A. Thorvilson

It is certified that error appears in the above-identified patent and that said Letters Patent is hereby corrected as shown below:

ON TITLE PAGE:

The list of inventors should read: -- Thomas G. Palkert, St. Paul; John A. Kolling, Eagan; Terry A. Thorvilson, Eagan, all of Minn. --

Signed and Sealed this

Eighth Day of October, 1991

Attest:

HARRY F. MANBECK, JR.

*Attesting Officer*   *Commissioner of Patents and Trademarks*